(12) United States Patent
Sonnenberg

(10) Patent No.: US 10,267,664 B2
(45) Date of Patent: Apr. 23, 2019

(54) FLOW METER INCLUDING TWO ANGLED COMPONENTS FORMING CHANNELS

(71) Applicant: DIEHL METERING GMBH, Ansbach (DE)

(72) Inventor: Hans-Michael Sonnenberg, Ansbach (DE)

(73) Assignee: Diehl Metering GmbH, Ansbach (DE)

( * ) Notice: Subject to any disclaimer, the term of this patent is extended or adjusted under 35 U.S.C. 154(b) by 579 days.

(21) Appl. No.: 14/886,260

(22) Filed: Oct. 19, 2015

(65) Prior Publication Data

US 2016/0041020 A1 Feb. 11, 2016

Related U.S. Application Data

(63) Continuation of application No. PCT/EP2014/000959, filed on Apr. 10, 2014.

(30) Foreign Application Priority Data

Apr. 18, 2013 (DE) .................. 10 2013 006 670

(51) Int. Cl.
| | | |
|---|---|---|
| *G01F 5/00* | (2006.01) | |
| *G01F 1/684* | (2006.01) | |
| *G01F 1/692* | (2006.01) | |
| *G01F 15/18* | (2006.01) | |

(52) U.S. Cl.
CPC .............. *G01F 15/185* (2013.01); *G01F 5/00* (2013.01)

(58) Field of Classification Search
CPC .... G01F 1/6842; G01F 1/6845; G01F 15/185; G01F 5/00; G01F 15/14; G01F 1/6965; G01F 1/05; G01F 1/66; G01F 1/68; G01F 1/662
See application file for complete search history.

(56) References Cited

U.S. PATENT DOCUMENTS

| | | | | |
|---|---|---|---|---|
| 4,653,321 | A * | 3/1987 | Cunningham | G01F 1/6842 340/606 |
| 5,083,455 | A | 1/1992 | Saito et al. | |
| 6,526,822 | B1 * | 3/2003 | Maeda | G01F 1/6842 73/204.21 |
| 7,614,295 | B2 * | 11/2009 | Niikawa | G01F 1/00 73/202.5 |
| 7,647,825 | B2 * | 1/2010 | Nakano | G01F 1/6845 73/204.26 |

(Continued)

FOREIGN PATENT DOCUMENTS

| | | |
|---|---|---|
| CN | 101551261 A | 10/2009 |
| CN | 100595524 C | 3/2010 |

(Continued)

*Primary Examiner* — Lisa M Caputo
*Assistant Examiner* — Brandi N Hopkins
(74) *Attorney, Agent, or Firm* — Laurence A. Greenberg; Werner H. Stemer; Ralph E. Locher

(57) ABSTRACT

A flow meter for a fluid, the flow meter including at least two channels which each comprise a floor, a ceiling and two walls, wherein at least one of the channels is a measuring channel in which a measuring device is arranged, wherein the flow meter includes a channel unit which realizes the channels, wherein the channel unit consists of at least one first component and at least one second component which are fitted into one another and in the joined state complement one another thus forming the channels.

19 Claims, 4 Drawing Sheets

(56) References Cited

U.S. PATENT DOCUMENTS

| | | | |
|---|---|---|---|
| 8,695,417 B2 | 4/2014 | Speldrich et al. | |
| 2003/0094041 A1* | 5/2003 | Iwaki | G01F 1/6842 |
| | | | 73/204.21 |
| 2012/0103086 A1* | 5/2012 | Goka | G01F 1/6842 |
| | | | 73/204.26 |
| 2013/0199289 A1* | 8/2013 | Hornung | G01F 1/6842 |
| | | | 73/202 |
| 2017/0254684 A1* | 9/2017 | Betz | G01F 1/44 |

FOREIGN PATENT DOCUMENTS

| | | |
|---|---|---|
| CN | 102620792 A | 8/2012 |
| EP | 1091195 A1 | 4/2001 |
| EP | 2482044 A1 | 8/2012 |

* cited by examiner

FLOW METER INCLUDING TWO ANGLED COMPONENTS FORMING CHANNELS

CROSS-REFERENCE TO RELATED APPLICATION

This application is a continuation, under 35 U.S.C. § 120, of copending international application No. PCT/EP2014/000959, filed Apr. 10, 2014, which designated the United States; this application also claims the priority, under 35 U.S.C. § 119, of German patent application DE 10 2013 006 670.0, filed Apr. 18, 2013; the prior applications are herewith incorporated by reference in their entirety.

BACKGROUND OF THE INVENTION

Field of the Invention

The invention relates to a flow meter for a fluid. The flow meter includes at least two channels which each comprise a floor, a ceiling and two walls. At least one of the channels is a measuring channel in which a measuring device is arranged.

Separating a part flow from the main flow and measuring only the part flow by means of a measuring device is advantageous for measuring fluid flows in channels and pipelines. When using some measuring principles, this is even necessary as they are not able to register a full flow. Some measuring principles, for example the thermal measuring principle for measuring a flow rate, can only register small volume ranges, other measuring principles, such as for example ultrasonic measuring of the flow speed, have to be applied multiple times in the case of high volume flows in order to ensure the volume flow is registered sufficiently.

Carrying out the measurement on a part flow additionally enables easier scaling of the measuring device to different flow quantities, pipe sizes and the like.

Part flows are usually measured by generating dynamic pressure by means of a dynamic pressure element that is arranged in the main flow, at least one measuring channel in which the fluid is measured branching off upstream or downstream of the dynamic pressure element. In the case of that configuration, the division of the flow, that is, in particular the proportion of the flow which flows through the measuring channel, is dependent on the operating conditions of the flow meter, that is in particular on the flow quantity, but also on the temperature, the type of fluid and the pressure. This leads to the measurement being falsified and having to be compensated for subsequently.

In addition, it is advantageous when laminar flows are generated both in the measuring channel and in the region of the dynamic pressure body. In addition to this, the production of narrow channels, as are necessary at least for the measuring channel, is very expensive.

SUMMARY OF THE INVENTION

It is accordingly an object of the invention to provide a flow metering device which overcomes the above-mentioned and other disadvantages of the heretofore-known devices and methods of this general type and which provides a flow meter that is improved, in particular with reference to the division of the flow, and which is producible in a cost-efficient manner.

With the foregoing and other objects in view there is provided, in accordance with the invention, a flow meter for a fluid, the flow meter comprising:

a channel unit formed with at least two channels each having a floor, a ceiling, and first and second walls;
at least one of the channels forming a measuring channel;
a measuring device disposed in the measuring channel;
the channel unit including at least one first component and at least one second component, the first and second components being fitted into one another and, in a joined state, complementing one another to thus form the channels.

In other words, the objects of the invention are achieved in that the flow meter includes a channel unit which implements the channels, and wherein the channel unit consists of at least one first component and at least one second component which are fitted into one another and in the joined state complement one another to form the channels.

The concept underlying the invention is that it is advantageous in the case of a measurement in a part flow when the flow is divided into a plurality of, in particular identical channels. Such a plurality of parallel channels is advantageous as, in this case, the distribution of the flows to the channels depends less on further parameters such as pressure, temperature and flow quantity as well as characteristics of the fluid than in the case where a measuring channel is branched off upstream or downstream of a dynamic pressure element. A channel unit which includes a plurality of channels can be produced in one piece but only in a very expensive manner and scarcely with sufficient precision. Production of a plurality of individual channels which open out in a supply channel is also very expensive.

Consequently, in the case of the flow meter according to the invention, the channel unit, which realizes the at least two channels, is assembled from two components, the channels not realizing the channels until the components are fitted together. Consequently, it is possible in a particularly simple manner to produce a flow meter with a plurality of parallel channels which comprise, in a preferred manner, parallel wall portions in the individual channel or portions with a constant cross section. In the simplest case, the first and the second component can be in each case an identical plate on which wall portions are arranged. If said plates are then put together such that the wall portions point to one another, channels are formed between the plates and the wall portions when the components are joined together. In this case, however, the individual components consist exclusively of a base and wall portions and are consequently easy to produce using many production processes such as, for example, sheet metal forming or plastics material injection molding.

The channel unit can also be formed, for example, by the first component consisting, in turn, of a base and wall portions, the second component, however, exclusively realizing a face which is placed onto said wall portions. A plurality of other realizations are also conceivable. Thus, a first component can be a basic body, which forms the ceiling, floor and side walls of the channel unit and is inserted into further second component in order to divide the channels. As an alternative to this, a first component can also consist of a base and of wall portions which are arranged thereon and form the parts of the walls. The second component, in this case, can also consist of a base and wall portions which form the further parts of the walls.

A considerable advantage of the realization of the channel unit from two or more components is that, in this case, it is also possible in an easy manner to form several parallel channels which comprise, however, narrowing's, curves, bending points or the like. Such channels are generally difficult to produce in one piece. In particular, it is not possible to mold such channel units in the case of production using plastics material injection molding. The production of the channel unit from two or more components is advantageous for this reason too.

When producing channel units, a plurality of channels are to be produced in the smallest space. In particular, to achieve a laminar flow it is advantageous when the channels are very narrow and very uniform. Typical channel widths are, for example, within the range of between 0.5 and 1.5 mm. Typical wall thicknesses are within the range of between 1 and 3 mm. As turbulence is to be avoided at least in the measuring region and a flow that is as laminar as possible is to be achieved, even minimum production tolerances can impair the measuring result considerably. In addition, production tolerances of the walls would also result in parallel channels having different flow resistances and consequently, in turn, in division of the flow which depends on a plurality of parameters.

A high degree of parallelism of the channel walls is also essential in order to achieve optimum flow characteristics. However, a large degree of parallelism of the walls is hardly possible, in particular when utilizing an injection molding process, if the two walls are formed by the same component. The wall portions, which form narrow portions which project from the component, have to be realized in a conical manner in this case in order to make reliable removal from the mold possible with a high level of precision. Typical draft angles of between 0.5 and 2.5 percent are usual in the case of injection molding. If high levels of precision are to be achieved, a minimum 2% draft angle is advantageous. If the walls are to be 1 mm thick, for example, and 20 mm high, in the case of a draft angle of 0.5 percent there would already be a change in the wall thickness over the channel height of approximately 0.2 mm. In the case of a typical channel width of 1 mm, this results in a 20 percent change in the channel width.

In order, nevertheless, to achieve a good level of parallelism of the walls, in particular when using injection molding methods to produce the components which form the walls, it is advantageous when in the case of at least one of the channels, at least in a longitudinal portion of the channel, the first wall of the channel is formed from the first component and the second wall of the channel is formed from the second component. This can apply, in particular, to all the channels. In this case, the first component can be produced in such a manner that the draft angle of a first wall of a channel extends in one direction and the second component in such a manner that the draft angle of a second wall of the channel extends in the other direction such that when the components are fitted together to form the channel unit, channels are formed, the walls of which are parallel.

As an alternative to this, plate-like components, which are inserted into a base which is formed from one or several further components, can also be utilized as walls. Such plates can be produced from diverse materials without bevels. In this case, it is particularly simple to utilize a separate component for each of the walls. In this case too, the walls of the channel are therefore also formed from two different components.

Changes in the structure of the channel can easily result in turbulence in the flow. In order to achieve a good laminar flow, a uniformly realized channel section should consequently comprise a certain minimum length. It is consequently advantageous when the length of the longitudinal portion is at least 7 mm, in particular at least 10 mm.

It is particularly advantageous when the first and the second component comprise in each case a base and wall portions which protrude from the base. The first and the second component therefore form in each case a comb-like structure. In particular, the base of the first component can form the floor of several parallel channels of the channel unit and the base of the second component can form the ceiling of several of said channels. The protruding wall portions of the first and of the second component can realize a wall in each case for each channel. Consequently, in particular where plastics material components or components produced using molding processes as described above are used, a considerable improvement in the parallelism of the walls is achieved.

The interlocking of two comb-like components for realizing the channel unit is possible in multiple ways. Thus, in the joined state, for parallel channels within one plane, one wall portion in each case can separate two channels. Thus, for example, a first channel would be defined on its left-hand side by a wall portion of the first component and on its right-hand side by a wall portion of the second component. A second channel, lying to the right of the first channel, which is consequently defined on its left-hand side by the wall portion of the second component and on its right-hand side by a further wall portion of the first component etc., would directly adjoin the wall portion of the second component.

In order to ensure the precision of the joined parts, the parts can be provided with fixing elements which enable perfect positioning during joining. This can be formed, for example, by elevations in the first component and by indentations in the second component. The fixing elements can be formed as a result of:
  a) elongation of the channel walls, e.g. in the case of plate-like components which are inserted into a groove,
  b) own tongue and groove systems,
  c) journals with fitting bores or
  d) wall portions which include joining partners.

The fixing elements can also be developed in a conical manner in order to facilitate joining. Additional threading aids can also simplify the mounting of the parts.

However, it can also be advantageous to space the channels at least in one portion of the channel unit. Using thick walls can be disadvantageous in particular in the case of injection molding, as sink points can occur on such walls which would result in inaccuracies in the channel geometry and consequently in intensified turbulent flows. In this case, it is advantageous when the walls of the spaces are formed in each case by portions of the same component. In order to achieve this, a first channel could be defined, in turn, on its left-hand side by a wall portion of the first component and on its right-hand side by a wall portion of the second component. However, a space, which is defined on its left-hand side by the wall portion of the second component and on its right-hand side by a further wall portion of the second component, would adjoin said wall portion of the second component. The second channel would be connected only to said second wall portion of the second component, etc.

It must be noted that in the two aforementioned examples all the channels do comprise parallel walls, but adjoining channels do not extend in parallel. Sometimes it may be desirable for adjacent channels to extend in parallel. It may also be desirable to achieve a variation in the wall thickness as a result of additional walls being inserted only in one portion of the channel. In both cases, it can be advantageous to interlock a first and a second component in such a manner that in each case a wall portion of the first wall and a wall portion of the second wall are in direct contact with one another. In this case, an arrangement, for example, is achieved where the left-hand wall of each channel is realized by a wall portion of a first component and the right-hand wall of each channel is realized by a wall portion of a second component.

It is possible that at least one of the wall portions which protrudes from the base is trapezoidal, in particular equiangular, in cross section at least in the longitudinal portion. As mentioned, in particular in the case of injection molded parts, but also in the case of a plurality of other methods of producing components, draft angles on protruding parts of the components are necessary in order to achieve a high level of precision. Frequently, however, it is possible to choose on which side of a protruding portion a draft angle is to be formed. In each case, however, a trapezoidal structure is created as a result of forming the draft angles.

In order to form the above-mentioned uniform channel structures, it is advantageous when said trapezoidal forms are equiangular as, in this case, it is particularly simple to join together channels with parallel walls. In contrast, however, it is possible that a non-uniform leg length of the trapezoidal form is desired. This is the case, for example, when the channel wall no longer extends substantially parallel to the flow direction but, for example in a region in which the channel becomes narrower, deviates from the parallelism with respect to the flow direction. In order to achieve a uniform change in direction of a laminar flow, it is frequently desirable when the channel comprises an identically formed wall over the entire height. The draft angles can be arranged on the side of a wall that is remote from the channel when the other side of the wall adjoins a space in order to bevel the side of the wall facing the channel as little as possible.

The described wall portions form projections of a base which forms the ceiling or floor of the channels. The base can be flat or ring-shaped perpendicular to the longitudinal direction of the channel at least in the longitudinal portion. A flat base with wall portions projecting from it can be utilized in order to form a channel unit which comprises a plurality of channels in one plane. In some applications, however, it is advantageous to arrange the gap channels in a ring-shaped manner. In this case, a ring-shaped base can be utilized for the first and second component.

As explained, the bevel on the wall portions typically corresponds to a draft angle, for example for use in an injection molding process. It is consequently advantageous to vary said bevel within a range which is particularly advantageous to removing the components from the mold. Very small draft angles and consequently almost right angles between the base and the wall portion are advantageous as in these cases almost parallel channels can be achieved without additional expenditure and also changing the direction of the flow or widening or narrowing the channels is possible in a particularly simple manner. In contrast, in many processes the precision of the molding process can be improved with a larger angle between the base and the wall portion and consequently with a larger draft angle. More precisely formed walls lead to less turbulence in the flow and consequently to an improvement in the measuring result of the flow meter. In the light of said consideration, it is advantageous when the angle between the base and at least one side face of the trapezoidal segment is between 87.0° and 89.5°, in particular between 87.5° and 88.7°.

As already mentioned in the introduction, it is also possible for the first component to be a basic body which is preferably realized in one piece and forms the floor, ceiling and side walls of the channel unit, wherein the basic body comprises slot-shaped openings on the floor and/or ceiling into which the second component, which is realized as a flat plug-in element, is inserted. Said realization of the flow meter according to the invention is advantageous in particular when the second component or the second components are produced from sheet metal. In this case, it is possible to produce highly precise, flat components in a simple and cost-efficient manner. However, other materials can also be used to produce very flat walls, for example glass or ceramic.

The basic body can be produced in a relatively simple manner as the basic body is a relatively rough structure. The volume of the basic body is initially relatively large and the channels are not formed until the walls are inserted. Minimum production deviations on the floor and/or ceiling clearly also influence the flow in the channels in a lesser manner than such on the walls as the height of the channels is usually greater by a multiple than the width and consequently the influence of the floor and/or ceiling on the flow is substantially less than that of the walls. Thus, for example, it is possible to produce the basic body in one piece as a result of injection molding and then to introduce metal sheets into it. If the channels inside the channel unit are substantially straight or if they comprise a slight uniform curvature, it is possible to dispense with the slot-shaped openings on the floor and/or ceiling and the second components can be inserted into the channel in the direction of the channel.

It is frequently desirable to vary the width of a channel along the course of the channel in the channel unit of a flow measuring device. The simplest possibility to vary the channel width would be a change in the thickness of the walls. Such a change in the wall thickness, however, is not possible easily in the case of all the production methods. Thus, for example, where the walls are produced from sheet metal, the metal sheet has to be folded. Consequently, on the one hand, it is not possible to vary the wall thickness in a stepless manner, on the other hand it can be very expensive in this case to achieve a uniform transition between the wider and the narrower region without turbulence. A variation in the channel width can also be problematical even when the walls are produced using an injection molding process. In particular, where there is a large amount of variation in the channel width, there would have to be, in this case, a big change in the wall thickness, as a result of which, however, in the case of injection molding processes, there is the risk of creating sink points and consequently reducing the precision in the channel geometry. It is consequently advantageous, as a rule, to utilize other methods to vary the channel width.

Thus, it is possible for at least one of the channels to comprise at least one angled region in which the direction of the channel is changed, wherein the width of the channel is different upstream and downstream of the angular region and wherein, in particular, the walls of the channel comprise the identical form in the angular region. This is possible in a particularly simple manner when the wall portions which form the walls of one or several channels are all formed in an identical manner, comprising a curvature or a bend at least at one point. If the channel unit comprises two or more of said wall portions which are offset to one another perpendicular to the channel direction, said wall portions thus now realize straight channels upstream of the bend or curvature point as described above. Downstream of the bend or curvature point, the spacing perpendicular to the original channel direction does remain constant, but the spacing between the walls in the channel direction is smaller. If the channel extends in said region at an angle $\alpha$ with respect to the original channel direction, the width of the channel in said second region can be expressed as the product of the original channel width with the cosine of α.

As an alternative to this or in addition to it, a narrowing region in the channel can also be formed as a result of a second wall portion being arranged in such a manner in the channel unit that in a first region the wall between two channels consists exclusively of one wall portion and in a second channel region consists of two wall portions. In this case, it is particularly advantageous when said two wall portions are part of two different components. It is therefore possible for at least one of the channels to comprise at least one first part region and at least one second part region, wherein at least one of the walls in the first part region is formed from a different component to in the second part region.

For example, it is possible for the walls of the channel unit to be formed by inserted flat plug-in elements. In this case, additional plug-in elements can be arranged at the points at which a narrowing of the channel is desired. A narrowing of the channels as a result of additional wall elements, however, is also possible when the channel unit consists of two or more interlocked components which in each case comprise a base and wall portions which protrude from said base. This is explained as an example by way of a channel unit which has already been described above where the first component forms the left-hand wall of the first channel, the right-hand wall of the second channel etc., and the second component forms the right-hand wall of the first channel, the left-hand wall of the second channel etc. Said first and second components can then be modified in such a manner that additional wall portions, which abut against a wall portion of the other component in a flush manner when the two components are joined together, are provided on at least one of the components. If said additional wall portions are only provided then in one or several regions of the component, a narrowing of the channel in precisely said regions can consequently be achieved.

It is particularly advantageous to provide additional wall portions in both of the components in the region in which the channel is to be narrowed. The achievement, consequently, is that in the regions in which there is not any narrowing present, the wall between two channels is formed in each case from one wall portion and in the regions in which the channel is to be narrowed, the wall between two channels is formed from two wall portions. The additional achievement here is that the two wall portions of one channel are formed from different components, as a result of which the draft angles are compensated for and the walls remain parallel. However, it must be noted that the direction of inclination of the channels is changed in this case at the transition from the non-narrowed to the narrowed region. This can, in turn, result in slight turbulence, as a result of which, for example, a measurement should not be carried out until after a certain minimum length of the narrowed portion.

In addition to this or as an alternative to it, it is possible for at least two of the channels to comprise at least one narrowing region in which the walls of the channels are guided in such a manner that the width of the channels decreases, wherein in the narrowing region the thickness of at least one wall between the channels is increased or one each of the walls of a first and of a second of the channels comprise opposing angulations, as a result of which the walls diverge and form a space. As already mentioned, a variation in the wall thickness is the simplest possibility of varying the width of the channels. It must be noted that such a variation in the wall thickness is not possible with a high degree of precision in the case of every manufacturing process. Consequently, it is frequently advantageous to guide the wall portions in such a manner that a space is created between two wall portions.

The forming of said space is possible in diverse ways. Thus, it is possible, when viewed in the flow direction of the fluid upstream of the narrowing region, for a wall portion of one of the components to be located between the two channels, between which the space is arranged in or behind the narrowing region. In this case, it is advantageous when the two walls which define the space are also formed by wall portions of the same component. Consequently, the component comprises a Y-shaped wall portion which consists of one single wall portion in the region upstream of the narrowing region and consists of two wall portions in the region behind the narrowing region and where the wall portions diverge at a certain angle in the narrowing region.

As an alternative to this, however, it is also possible for the walls which define the space to be formed from wall portions of two components in the or behind the narrowing region. In the majority of cases, a fluid exchange should be avoided between the channels in the and upstream of the narrowing region. In order to make this possible, the wall between two channels can already be formed from two wall portions of two components upstream of the narrowing region. However, it is also possible for a wall portion of a second component not to be joined to the portion of a first component which forms the wall upstream of the narrowing region until the narrowing region. Such an arrangement, however, makes particularly great demands on the tightness of the contact region between the wall portion of the first component and of the second component.

It is possible for the walls of the space to end freely in a channel or for the space to be closed off. Thus, it may be desirable for the channels to be widened again initially before they are guided together again at the end of the channel unit. In this case, the end of the space can be realized in a similar manner to the narrowing region, but with the walls now extending in the opposite direction.

A measurement is already frequently taken, however, in the narrowing region and the channels are to be guided back together again similarly behind the narrowing region. In said case, the walls of the space can end freely in a channel.

In particular when the walls of the space end freely in the channel and when the composition of the fluid changes in time, it is advantageous when the floor and/or the ceiling in the region of the space comprise at least one opening for supplying fluid, in particular filtered fluid. If the channel unit is constructed in such a manner that a space is open on one side, there is only one small fluid flow in said space. Consequently, the gas exchange inside said gap is also reduced. If then a fluid is measured where the composition is able to change a great deal, for example when measuring natural gas or the like, without the opening for supplying fluid, a region would be created in which the fluid composition only changes slowly. In this case, gas could diffuse out of the space back into the measuring region and falsify the measurement. In order to avoid this, flushing the space is advantageous.

As described in the introduction, in the region in which the direction of the gas is changed, the wall of the channel should be as perpendicular as possible in order to enable uniform changing of direction and to maintain the laminar flow. It is advantageous when in the narrowing region the wall on the channel side is perpendicular to the floor and ceiling, wherein the wall on the space side is beveled.

In addition, it is advantageous to have as large a number as possible of parallel channels. Measuring is then possible on particularly small part volumes and can consequently be carried out in a particularly precise and/or particularly cost-efficient manner. In order to increase the number of measuring channels, it is advantageous when the channel unit is assembled from several components and the channels are realized in at least two planes. Two embodiments, in particular, are advantageous.

Thus, the channel unit can consist of a one-piece or multi-piece basic body into which flat plug-in elements are introduced as walls. In this case, the basic body can be realized such that the floor and ceiling parts of all the channels or at least a plurality of channels comprise slot-shaped openings and consequently it is possible to utilize one single plug-in element in order to form one wall of a plurality of channels.

When using components which consist of a base and of wall portions which protrude from the base, it is advantageous when at least some of said components comprise wall portions on two opposite sides of the base. Consequently a single component can form several channels, in one plane parts of the walls and the ceiling and in a further plane located above it, parts of the walls and the floor.

Common to both embodiments is that one single component forms in each case walls of channels in several planes.

As described in the introduction, the channel unit of the flow meter is to realize preferably a plurality of channels in which, where possible along the entire length, however in particular in the region of the measuring device, a laminar flow of the fluid is achieved, the flow resistance of the channels preferably being identical. It is consequently advantageous that in a portion of the channel device, the length of which is a least 7 mm, in particular at least 10 mm, or over the entire length of the channel unit, the width of each channel is the same, in particular between 0.5 mm and 1.5 mm, and/or the ratio between the height and the width of at least one of the channels is at least 3:1, in particular at least 5:1 and/or the material thickness of the walls is between 1 mm and 3 mm, in particular between 1.5 mm and 2.5 mm.

In particular, portions in the region of the measuring device should comprise a minimum length in order to enable the flow to be stabilized and the turbulent flows which occur when the channel geometry is altered to be compensated. As a rule, the width of the channels is to be chosen as small as possible as in this case a particularly uniform laminar flow can be achieved. At the same time, the width of the channels must be large enough to ensure that unavoidable production tolerances result only in inconsiderable disturbance to the flow. A similar consideration is applicable to the wall thickness. In particular, when using injection molding processes, there is the risk in the case of overly thick walls that sink points and consequently inaccuracies in the channel geometry occur. At the same time, the wall thickness should however be considerably greater than the production tolerances when producing the components. In addition, the wall has to be thick enough in order to be able to realize a draft angle. In the light of said considerations, the named values are produced as optimum ranges.

In addition, to achieve a good laminar flow it is advantageous to have a channel which is very narrow in comparison to its height. This is particularly advantageous as a certain deforming of the flow profile close to the ceiling or the floor is unavoidable and in the case where a height is a multiple of the width, said regions extend only over a fraction of the height. Greater ratios of height to width, for example 10:1 or 15:1, can be advantageous as in the case of such a large ratio of height to width, the influence of the height on the flow resistance is almost negligible and consequently, for example, for a channel with a height modification, a variation in the flow speed can be achieved without the flow resistance of the channel being changed markedly.

To avoid turbulence, it is additionally advantageous when the ratio between the height and the width of at least one of the channels remains constant over the entire length of the channel unit.

As described, it is crucial in the case of the flow meter according to the invention that a predefined channel geometry is achieved. A displacement of the at least two components toward one another can result in the width of some channels being changed in relation to other channels or the walls of the channels not being parallel. In both cases, the measuring accuracy drops considerably. It is advantageous when in the joined state, a locking element, which is arranged on the components or is arranged in a separate manner, or a firm seat of the components with regard to one another prevents a relative displacement of the components. The firm seat of the components with regard to one another can also be improved, for example, by sealing elements which are deformable and are arranged between the components. In this case, the components press the sealing elements against one another, as a result of which, on the one hand, there is an improvement in the sealing of the channels amongst themselves and, on the other hand, possibly a firmer seat of the components with regard to one another. Obviously, sealing of the channels independently of the fastening of the components against one another is also advantageous.

In order to enable the flow meter to be produced in an economic manner, it is advantageous when said flow meter is produced using a cost-efficient production method and is produced from favorable materials. To this end, the components can be produced from plastics material, in particular as a result of injection molding or, are produced from metal, preferably sheet metal, in particular the plug-in parts.

As boundaries of the individual channels consist at least in portions of at least two or more components, it is necessary, where applicable, to seal the joints or to define the passage of the fluid such that the leakages do not have any considerable influence on the flow in the measuring channel and the associated measuring system. This is particularly important where wall portions separate fluid regions which comprise different dynamic or static pressure ratios. This is the case, for example, when components of the inlet region are located close to components of the outlet region.

As a result of the parts interlocking in an in-depth manner, in particular in the case of a labyrinth-like development, a gap can be formed through which only the smallest fluid volumes, which no longer influence the flow in the gap channels, are able to flow. In addition to this or as an alternative to it, a sealing element between the components can make sealing possible. Said sealing element can be both injected on a component or developed as a molded seal. In an ideal manner, the sealing element is an elastomer. As an alternative to this, sealing may also be effected by means of a sealing adhesive. The sealing elements may only be provided on those wall portions where a leak may occur.

Other features which are considered as characteristic for the invention are set forth in the appended claims.

Although the invention is illustrated and described herein as embodied in a flow meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
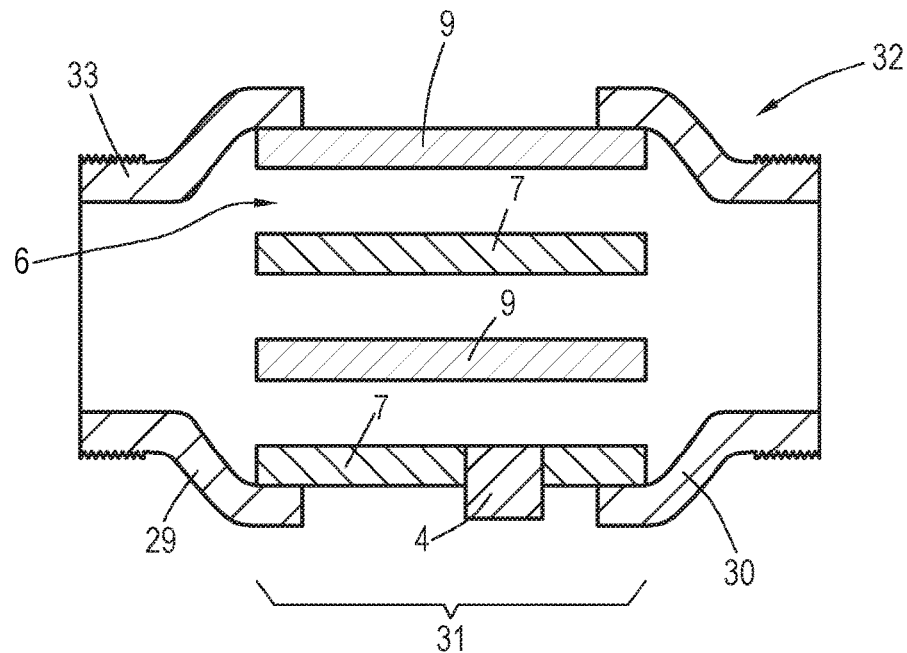
FIG. 1 is a sectional view of an exemplary embodiment of a flow meter according to the invention.

Referring now to the figures of the drawing in detail and first, particularly, to FIG. 1 thereof, there is shown a section through a flow meter. The flow meter 32 consists of five components, namely, two connecting components 29, 30 which implement connections 33 of the flow meter 32, a first and a second component which implement the channel unit 31 of the flow meter 32, and a measuring device 4. The first and the second component are interlocked perpendicular to the image plane and form the channels. In the illustrated case, the first component forms the floor of the channels and two of the wall portions 7 and the second component forms the ceiling (not shown) of the channels and the two wall portions 9. The connecting components 29, 30 are elastic and hold the channel unit 31 as a result of a frictional connection (i.e., a force fit).

It will be understood that the connections 33 can also be arranged directly on the first and/or second component, or the channel unit 31 can be inserted into a closed housing.

Figure 2:
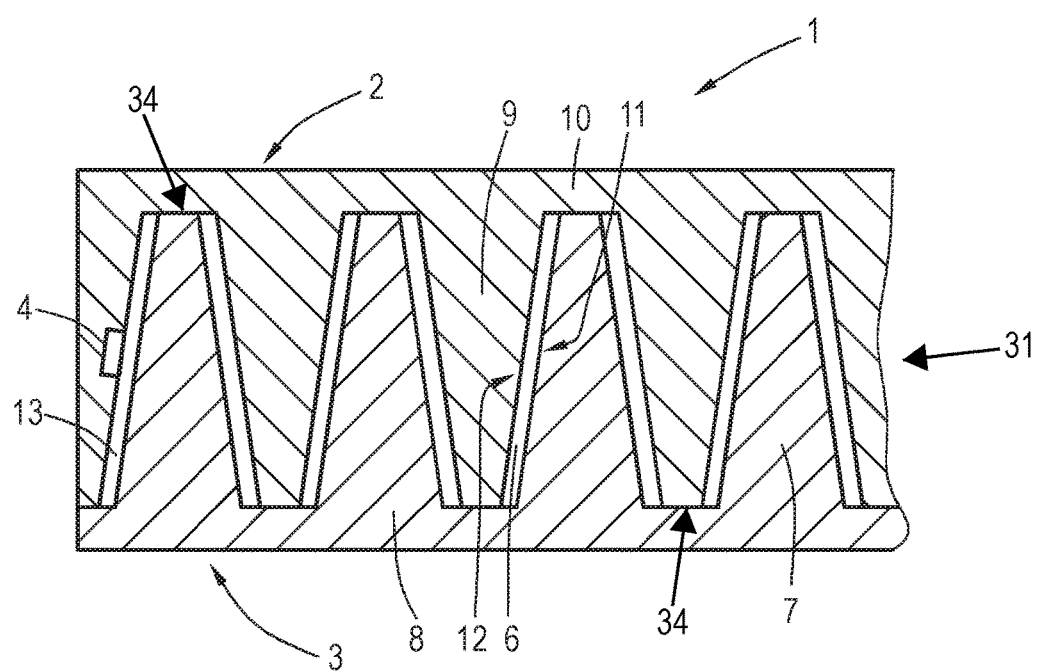
FIG. 2 shows a sectional view of a further exemplary embodiment of a flow meter according to the invention.

FIG. 2 shows a sectioned view of a further flow meter. The flow meter 1 includes a channel unit which is assembled from the first component 2 and a second component 3, as well as a measuring device 4. Fluid flows into the flow meter 1 and is distributed to a plurality of channels 6 in a region that is not shown. The division of the flow into channels is particularly possible by a rectangular channel opening out directly into a channel unit which includes a plurality of wall portions 7, 9, as a result of which the wall portions 7, 9 act as dynamic pressure elements and the fluid is distributed to the channels 6. Obviously, alternative realizations are also possible, for example the wall portions 7, 9 can comprise a streamlined form at their ends facing the flow.

The component 2 is formed of a base 10 and of a plurality of wall portions 9 which protrude from the base. The component 3 also consists of a base 8 and of a plurality of wall portions 7 which protrude from the base 8. When the components 2, 3 are joined together, the channels 6 are formed between the wall portions 7, 9. The channels are delimited by a ceiling, which is formed by the base 10 of the first component 2, and a floor, which is formed by the base 8 of the second component 3, as well as by the wall 12, which is formed by the wall portion 9 of the first component 2 and the wall 11 which is formed by the wall portion 7 of the second component 3.

The first component 2 and the second component 3 are produced using injection molding methods. In order to enable a high degree of precision, it is consequently necessary for the wall portions 7, 9 protruding from the base 8, 10 to comprise draft angles. Consequently, the wall portions 7, 9 comprise a trapezoidal form. This leads to the walls 11, 12 of the channel 6 not forming a right angle to the floor and the ceiling of the channel 6. As, however, the wall 12 is formed by the first component 2 and the wall 11 is formed by the second component 3, the identical draft angles of the wall portions 9 and 7 result in the two walls 11, 12 of the channel 6 nevertheless extending in parallel.

Notwithstanding a favorable production using the injection molding process, it is therefore possible to realize channels 6, the walls 11, 12 of which are parallel. One of the channels 6 is the measuring channel 13 in which a measuring device 4 is arranged. As the flow meter 1 has a plurality of channels which comprise an identical flow resistance, a fluid which flows into the flow meter 1, can be distributed in a particularly good manner to the channels and measurements can be carried out on the part flows in a particularly reliable manner.

Figure 3:
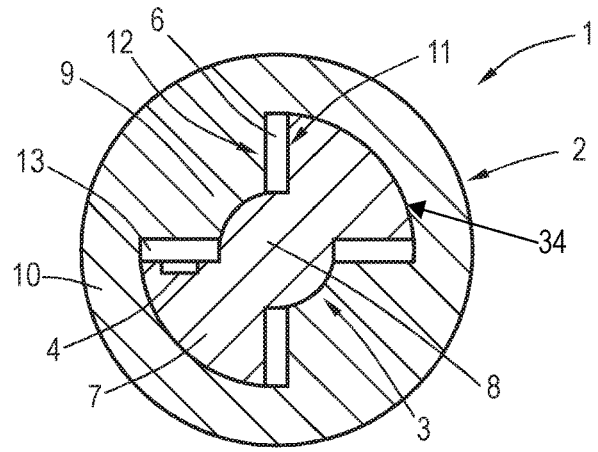
FIG. 3 shows a sectional view of a third exemplary embodiment of a flow meter according to the invention.

FIG. 3 shows a third exemplary embodiment of a flow meter. The flow meter 1 is a round device in this case. Consequently, a particularly simple connection to round pipes can be achieved for example. The design of the flow meter 1 is similar to that of the flow meter shown in FIG. 1. The first component 2 and the second component 3, however, have to be designed differently on account of the form of the flow meter 1. In this case, the first component 2 forms a ring which forms the base 10 and on which trapezoidally formed wall portions are arranged. The second component 3 is inserted into the first component 2 and comprises a substantially circular base 8 on which equally trapezoidally formed wall portions 7 are arranged. The realization of the channels and the measuring of the fluid flow are effected in an equivalent manner to the flow meter which is shown in FIG. 2. Consequently, that description need not be repeated here.

Figure 4:
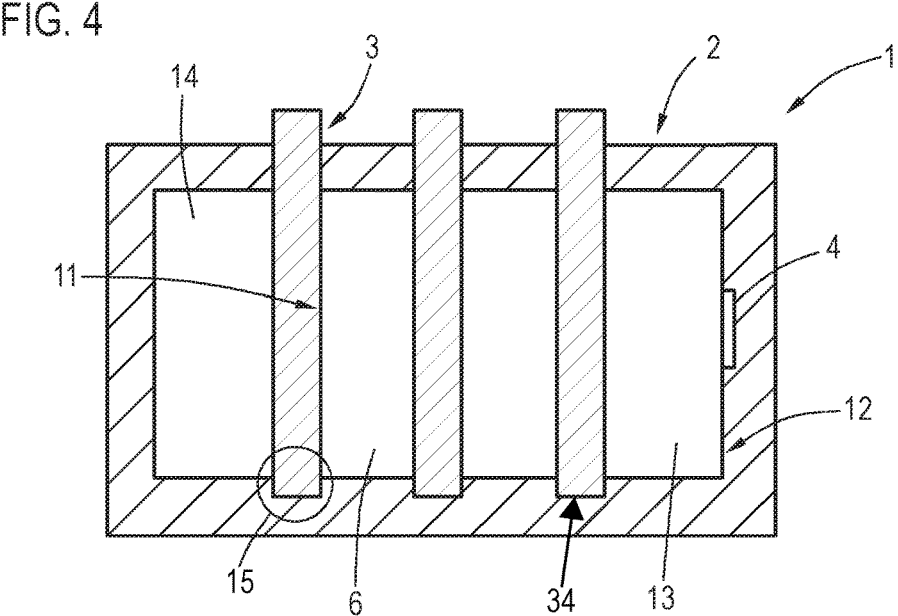
FIG. 4 shows a sectional view of a fourth exemplary embodiment of a flow meter according to the invention.

FIG. 4 shows a fourth exemplary embodiment of a flow meter for a fluid. The flow meter here is assembled from a first component 2 and several second components 3. The first component 1 forms the floor and the ceiling of the channels as well as the two side walls 12. The second components 3 are inserted into the first component 2 through slots in the ceiling of the first component 2. The second components 3 engage in grooves in the inside surface of the floor of the first component 2 in the region 15. The inner channels 6 are formed here in each case by two walls 11 of the second components 3, the left-hand and right-hand wall of an inner channel 6 being formed in each case by different second components 3. The walls of the side channels 14 are formed by a wall 11 of the second component 3 and a wall 12 of the first component 2. The measuring channel 13 is a side channel 14 in this case. A sensor 4 for measuring the flow rate is arranged in the measuring channel 13.

Figure 5:
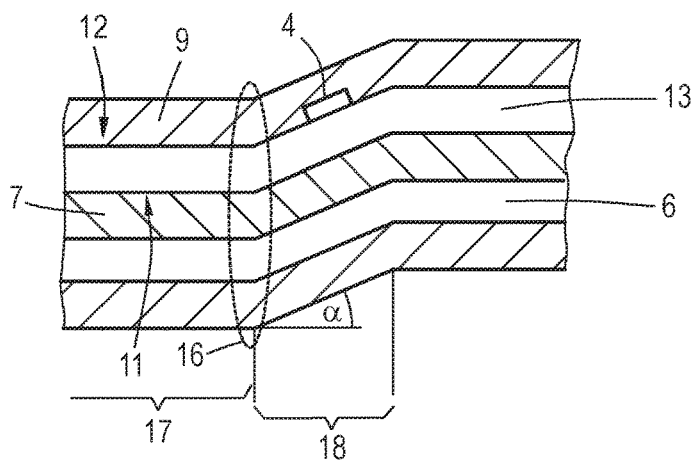
FIG. 5 shows a sectional view of a fifth exemplary embodiment of a flow meter according to the invention.

FIG. 5 shows a sectioned view of a flow meter where a narrowing region is achieved by angling the channels. A first region of the channel 6 and of the measuring channel 13 extend in a straight line and are designed in a similar manner to the channels in the preceding exemplary embodiments. However, in FIG. 5 the direction of the flow of the fluid in the channels is in the section plane. The topmost and bottommost wall portion 9 are part of a first component. The middle wall portion 7 is part of a second component. The first and second components here are produced from plastics material using the injection molding method and are designed corresponding to the components described in FIG. 2. It can be noted that a similar design is also possible when each of the wall portions is realized as a separate component, as shown for example in FIG. 4. In this case, it is for example also possible to form the wall portions from plugged-in metal sheets or the like.

The development of the wall portions 7, 9 is changed at the angled region 16 by an angle α. Correspondingly, the direction of flow of a fluid flowing into the angled region 16 from portion 17 is also changed such that the direction of the fluid is once again parallel to the walls, the change in the flow direction at the angled region being effected such that the flows remain substantially laminar.

As the wall portions 9, 7 are formed identically and are only displaced relative to one another in the direction perpendicular to the flow direction, the angling in the angled region 16 by an angle α results in the width of the channels being changed. The width of the channels in the region 18 corresponds to the product of the width of the channels 6, 13 in the region 17 with the cosine of the angle α. The angle α is for example 45°. Consequently, the width of the channels in the region 18 is approximately 70% of the width of the channels 6, 13 in the region 17.

Figure 6:
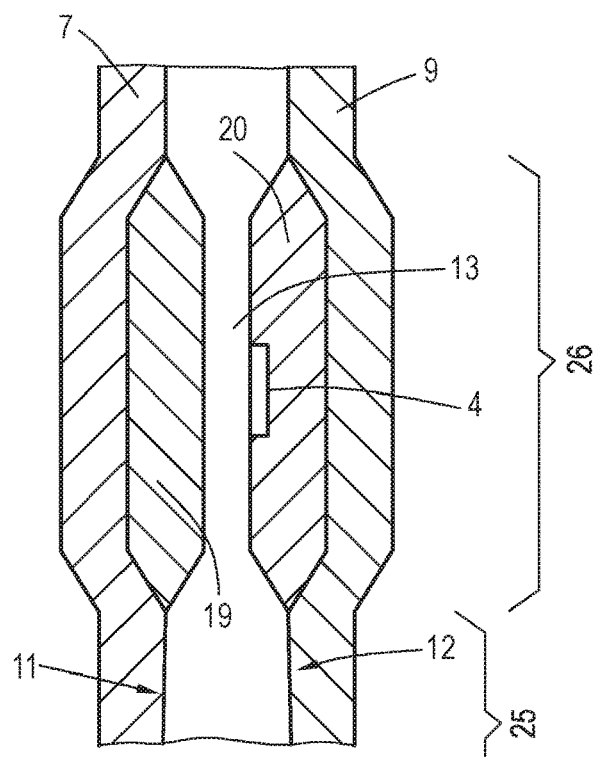
FIG. 6 shows a sectional view of a sixth exemplary embodiment of a flow meter according to the invention.
Figure 7:
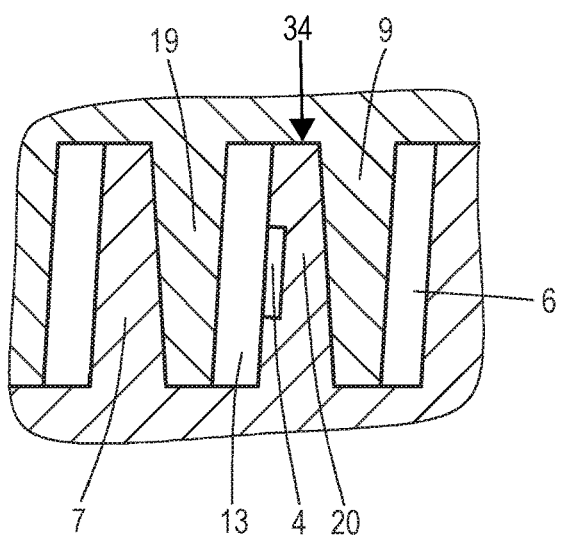
FIG. 7 shows a second sectional view of the flow meter shown in FIG. 6.

FIGS. 6 and 7 show a further exemplary embodiment for narrowing a measuring channel in the measuring region of a flow meter. In the non-narrowed region 25, the flow meter is designed substantially as the flow meter shown in FIG. 2. Here too, the measuring channel 13 is defined by the wall 11, which is formed by the wall portion 7 of the second component, and the wall 12 which is formed by the wall portion 9 of the first component. However in the region 18, the second component comprises a further wall portion 20 along with the wall portion 7 and the first component comprises a further wall portion 19 along with the wall portion 9. The further wall portions 20, 19 have a shorter length compared to the wall portions 7 and 9, this means they do not extend over the entire channel unit, but only over a short portion of the channel unit. The wall portions 7 and 9 are additionally offset perpendicularly to the channel direction in portion 26 in relation to their position in portion 25. Consequently, a decrease in the channel width is achieved as a result of inserting additional wall portions 19, 20 into the channel 13.

Said narrowing has several consequences. On the one hand, the walls 11, 12 in portion 26 are formed by different components to in portion 25. Thus, wall 11 in portion 25 is formed by the wall portion 7, which is part of the second component, in portion 26, however, it is formed by the further wall portion 19 which is part of the first component. In addition, inserting the further wall portions 19, 20 in the region 26 results in the tilting of the channel 13 in the region 26 changing in relation to the tilting in the region 25. This can be seen particularly well when the sectioned views are observed perpendicular to the channel direction. Thus, FIG. 7 shows a section of the flow meter, shown in FIG. 6, in the region 26. A section of the flow meter, shown in FIG. 6, in region 25 corresponds substantially to the section shown in FIG. 2. By comparing FIG. 2 and FIG. 7, it can be seen that adjacent channels are inclined alternately to the left and to the right in FIG. 2, whereas all the channels are inclined to the right in FIG. 7.

This can be explained as a result of the inclination of one channel being determined as a result of which component forms the left-hand or right-hand wall of the component. In the region 25 or FIG. 2, the left-hand wall of adjacent channels is formed by different components, which results in different angles of inclination. In the case of a flow meter according to FIG. 6 and FIG. 7, the wall portions 19, 20 are inserted in the region 26 in each second channel. The result here is that in region 26 the left-hand wall of each channel is formed by the first component and the right-hand wall of each channel is formed by the second component. This can be seen easily again in FIG. 7. In channel 13, the left-hand wall is formed by the additional wall element 19, which is formed by the first component, in the adjacent channel 6 the left-hand wall is formed by the wall portion 9 which is also part of the first component.

Figure 8:
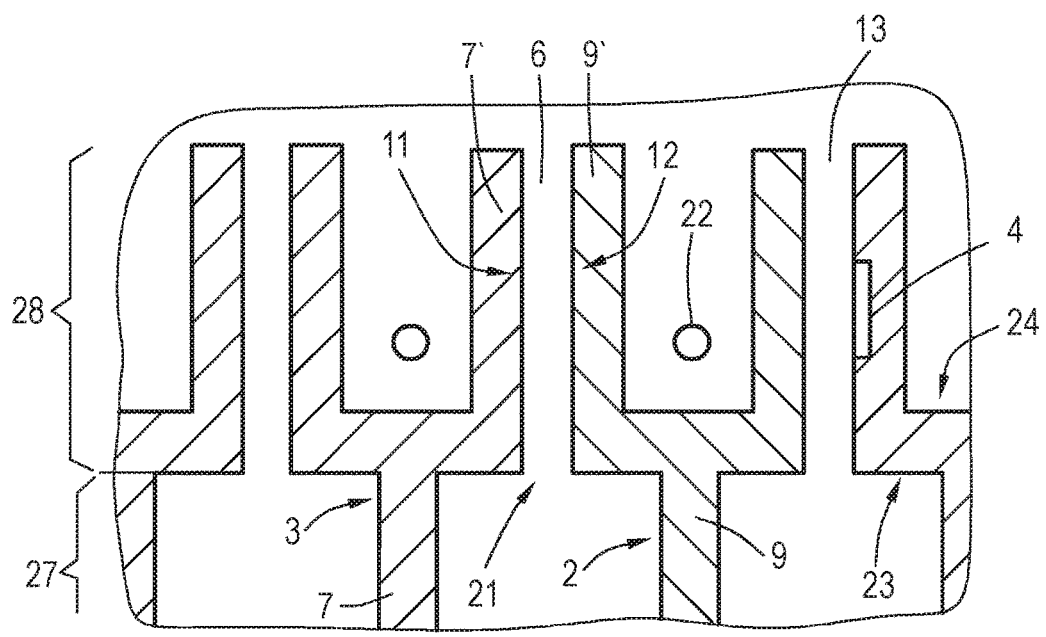
FIG. 8 shows a sectional view of a seventh exemplary embodiment of a flow meter according to the invention.

FIG. 8 shows a further exemplary embodiment for forming a narrowing of a channel 6. The channel unit of the flow meter is once again formed from two components, the first component realizing the wall portions 9, 9' and the second component the wall portions 7, 7'. In a first region 27, the design of the channel device corresponds to the design shown in FIG. 2. In region 28, the two wall portions 7, 9 are divided in a Y-shaped manner into in each case two wall portions 7' and 9', as a result of which a space is formed between the channels. The width of the channel 6 can be clearly reduced as a result.

Should a similar width reduction be effected as a result of increasing the wall thickness, in the case of many production processes, for example, plastics material injection molding, the forming of sink points in the walls and consequently a reduction in precision is to be feared. Consequently, the wall guiding shown is advantageous. A narrowing region 21, in which the walls 23, 24 are guided substantially perpendicular to the flow direction of the fluid, is arranged between the regions 27 and 28. In order to avoid turbulence, the wall 23 facing the fluid should be perpendicular to the floor and ceiling of the channel in said region, it being possible to arrange the draft angle in said region on the wall 24 facing the space.

In the region 28 openings 22 are also shown in the region of the spaces. In the exemplary embodiment shown, the wall portions 7' and 9' open out freely into a further channel downstream of the narrowing region 28. Without additional ventilation, fluids could dwell a relatively long time in the spaces. If, in this case, the composition of the gas which flows through the flow meter were to change, this would be disadvantageous as the gas could diffuse from the spaces into the measuring region and could falsify the measurement.

Figure 9:
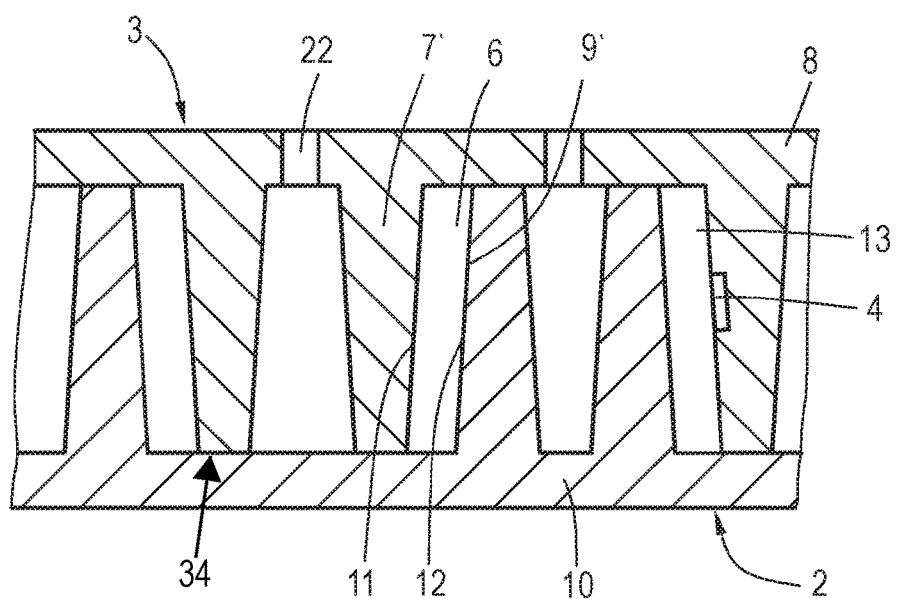
FIG. 9 shows a second sectional view of the flow meter shown in FIG. 8.

Thus, flushing the spaces through the openings 22 in the floor or the ceiling is advantageous. Flushing can be affected, for example, with gas which is returned from the outlet of the flow meter, however the fluid can also be filtered before it is introduced into the openings 22. In order to illustrate the design of the Y-shaped wall portions, in particular in region 28, FIG. 9 shows a section perpendicular to the channel direction. It can be seen that the first component 2 and the second component 3 interlock in such a manner that two wall portions 9' of the first component 2 are located between in each case two wall portions 7' of the second component 3 in the transverse direction. Thus, the wall portions 7' form the left-hand wall of the channel 6 and the right-hand wall of the measuring channel 13. The wall portions 9' of the first component 2 form the right-hand wall of the channel 6, the left-hand wall of the channel 13 as well as the walls of the space between the channels 6 and 13.

Obviously, the individual features of the exemplary embodiments can be combined freely. Thus, all the described examples for narrowing channels are described by way of using two interlocking components; however, for the person skilled in the art it is easy to see that the described examples can also easily be adapted to the case in which the walls are formed by second components which are inserted into the basic body. In addition, it is also revealed easily to the person skilled in the art that several channel planes can be arranged one above another by further wall portions, which form walls of the channels of a second channel plane, being arranged on the second side of the base of the first and/or of the second component. Just as easily it is possible to form a multi-layered basic body or to stack several basic bodies, the flat plug-in elements preferably forming the walls of several channels located one above another. The different examples for channel narrowing and direction changing can also be transferred to the round geometry described as an example in FIG. 3. In addition, the number of channels formed is also obviously freely variable in all the examples.

The invention claimed is:

1. A flow meter for a fluid, the flow meter comprising:
a channel unit formed with at least two channels each having a floor, a ceiling, and first and second walls;
at least one of said channels forming a measuring channel;
a measuring device disposed in said measuring channel;
said channel unit including at least one first component and at least one second component, said first and second components being fitted into one another and, in a joined state, complementing one another to thus form said channels;
wherein, in a longitudinal portion of at least one of said channels, said first wall is formed by said first component and said second wall of said channel is formed by said second component; and
wherein each of said first and second components has a base and wall portions protruding from said base, and at least one of said wall portions protruding from said base of said first component has a trapezoidal cross section at least in said longitudinal portion and at least one of said wall portions protruding from said base of said second component has a trapezoidal cross section at least in said longitudinal portion.

2. The flow meter according to claim 1, wherein a length of said longitudinal portion is at least 7 mm.

3. The flow meter according to claim 1, wherein said base is flat or ring-shaped perpendicular to a longitudinal direction of said channel, at least in said longitudinal portion thereof.

4. The flow meter according to claim 1, wherein an angle enclosed between said base and at least one side face of said trapezoidal segment lies between 87.0° and 89.5°.

5. The flow meter according to claim 1, wherein at least one of said channels comprises at least one angled region in which a direction of said channel changes, wherein a width of said channel is different upstream and downstream of said angled region and wherein said first and second walls of said channel have an identical form in said angled region.

6. The flow meter according to claim 1, wherein at least one of said channels comprises at least one first part region and at least one second part region, and wherein at least one of said first and second walls in said first part region is formed by a different component than in said second part region.

7. The flow meter according to claim 1, wherein at least two of said channels are formed with at least one narrowing region in which said walls of said channels are guided such that a width of said channels decreases, wherein in said narrowing region the thickness of at least one wall between said channels is increased or one each of said walls of a first and of a second of said channels have opposing angulations, to cause said walls to diverge and form a space in between.

8. The flow meter according to claim 7, wherein said walls of said space ends freely in a channel or said space is closed off.

9. The flow meter according to claim 7, wherein at least one of said floor or said ceiling in the region of said space is formed with at least one opening for supplying fluid.

10. The flow meter according to claim 7, wherein, in said narrowing region, said wall on a channel side is perpendicular to said floor and ceiling, and wherein said wall on a space side is beveled.

11. The flow meter according to claim 1, wherein said channel unit is assembled from a plurality of components and forms channels in at least two planes.

12. The flow meter according to claim 1, wherein one or more of the following are true with regard to a portion of said channel device:
said portion having a length of at least 10 mm;
said portion extending over an entire length of said channel unit;
said channels in said channel portions have an identical width;
the width of said channels is between 0.5 and 1.5 mm;
a height-to-width ratio of at least one of said channels is at least 3:1; and
a material thickness of said walls is between 1 mm and 3 mm.

13. The flow meter according to claim 1, wherein a ratio between a height and a width of at least one of said channels remains constant over an entire length of said channel unit.

14. The flow meter according to claim 1, wherein said components, in a joined state thereof, are prevented from relative displacement by a locking element disposed on said components or arranged separately therefrom, or said components are firmly seated relative to one another.

15. The flow meter according to claim 1, wherein said components are produced from molded plastics material.

16. The flow meter according to claim 1, wherein said components include plug-in parts and said plug-in parts of said components are produced from sheet metal.

17. The flow meter according to claim 1, wherein a joints between two channel-forming components are formed such that only quantities of fluid which represent a negligible quantity in relation to the channel flow are able to penetrate through a gap thereof.

18. The flow meter according to claim 1, which comprises a labyrinth seal, a seal with a molded sealing element, an elastic sealing means, or a sealing adhesive, or a seal attached by an injection molding process disposed at least in portions at a joint between said channel-forming components.

19. The flow meter according to claim 1, which comprises guide means configured to ensure that component parts are directed into a precise joining position during assembly.

* * * * *